(12) United States Patent
Wen et al.

(10) Patent No.: US 7,310,704 B1
(45) Date of Patent: Dec. 18, 2007

(54) SYSTEM AND METHOD FOR PERFORMING ONLINE BACKUP AND RESTORE OF VOLUME CONFIGURATION INFORMATION

(75) Inventors: Tianyu Wen, San Jose, CA (US); Chris C. Lin, San Jose, CA (US); Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 403 days.

(21) Appl. No.: 10/979,898

(22) Filed: Nov. 2, 2004

(51) Int. Cl.
*G06F 13/10* (2006.01)
(52) U.S. Cl. .................................... 711/114
(58) Field of Classification Search ............... 711/114, 711/162
See application file for complete search history.

(56) References Cited

U.S. PATENT DOCUMENTS

2004/0054866 A1* 3/2004 Blumenau et al. .......... 711/202
2005/0034122 A1* 2/2005 Kung et al. ................. 717/177

OTHER PUBLICATIONS

Johannes Helmig, "Recovering Windows XP via ASR Automatic System Recovery," http://www.windowsnetworking.com/pages/article_p.asp?id=252, Apr. 21, 2002, © 1995-2005 WindowsNetworking.com, 11 pages (printed Feb. 10, 2005).
Gene Trantham, "VxVM Private Regions: Mechanics & Internals of the VxVM Configuration Database," Sun BluePrints™ OnLine—Jul. 2000, http://www.sun.com/blueprints, © 2000 Sun Microsystems, Inc., 23 pages.
"dgcfgbackup(1M)," VERITAS Volume Manager, HP-UX 11i Version 1.6: Jun. 2002, http://docs.hp.com/cgi-bin/pf-new.cgi?IN=/en/B3921-90010/dgcfgbackup.1M.html&printa..., 2 pages (printed Feb. 10, 2005).
"dgcfgrestored(1M)," VERITAS Volume Manager, HP-UX 11i Version 1.6: Jun. 2002, http://docs.hp.com/cgi-bin/pf-new.cgi?IN=/en/B3921-90010/dgcfgrestore.1M.html&printa..., 5 pages (printed Feb. 10, 2005).
VERITAS Volume Manager™ 4.0, Troubleshooting Guide—Solaris, Chapter 5, "Backing Up and Restoring Disk Group Configurations," Feb. 4, 2004, pp. 61-66.

\* cited by examiner

*Primary Examiner*—Kevin L. Ellis
(74) *Attorney, Agent, or Firm*—Campbell Stephenson LLP; Brenna A. Brock (57) ABSTRACT

Various embodiments of systems and methods are disclosed for performing online backup and restore of volume configuration information. In some embodiments, a method involves receiving a request to restore a volume configuration and, in response to the request, writing volume configuration information to a storage device. The volume configuration information includes a first disk signature, which identifies the storage device.

31 Claims, 9 Drawing Sheets

SYSTEM AND METHOD FOR PERFORMING ONLINE BACKUP AND RESTORE OF VOLUME CONFIGURATION INFORMATION

FIELD OF THE INVENTION

This invention relates to volume virtualization and, more particularly, to backing up and restoring volume configuration information.

BACKGROUND

A virtualization module creates and manages one or more logical storage devices (e.g., volumes). A virtualization module can be implemented in hardware, software, or a combination of the two. VERITAS Volume Manager™ is an example of a virtualization module. Applications such as databases and file systems view and access the logical volumes managed by the virtualization module in the same way that the applications would view and access physical storage devices. By providing applications with virtualized volumes, the virtualization module obscures the details of the storage implementation from the applications. For example, the details of relatively complex storage arrangements that are used to provide improved performance and/or fault tolerance can be hidden from a file system.

Each logical volume can be implemented on one or more physical storage devices. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one logical volume can be implemented on the same physical storage device.

In order to manage a logical storage device, a virtualization module maintains volume configuration information. Typically, volume configuration information is maintained for each physical storage device used to implement the logical volume. When a storage device is corrupted, access to the volume configuration information stored on that storage device may be inhibited. This in turn can negatively impact the virtualization module's ability to access data stored in the logical volume. Accordingly, improved techniques for providing access to such volume configuration information is desired.

SUMMARY

Various embodiments of systems and methods are disclosed for performing online backup and restore of volume configuration information. In some embodiments, a method involves receiving a request to restore a volume configuration and, in response to the request, writing volume configuration information to a storage device. The volume configuration information includes a first disk signature, which identifies the storage device.

In one embodiment, the method also involves providing a user interface to a user. The request to restore the volume configuration is received via the user interface. The user accesses the user interface without needing to first perform a reboot.

In one embodiment, a second disk signature stored on the storage device is compared with the first disk signature included in the volume configuration information. The comparison is performed prior to writing the volume configuration information to the storage device. The volume configuration information is written to the storage device in response to the second disk signature equaling the first disk signature.

The volume configuration information can be backed up by copying the volume configuration information from one or more storage devices to a backup storage device. The backup can be initiated in response to detection of a request to backup the volume configuration information. Alternatively, the backup can be initiated in response to detection of a modification to the volume configuration information.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A virtualization module provides virtualized storage devices, referred to as volumes, for use by applications. The volumes are implemented on at least a portion of one or more physical storage devices such as hard disks, storage arrays, and the like. The virtualization module stores volume configuration information corresponding to the volume on each physical storage device on which the volume is implemented. The virtualization module provides a user interface for backing up and/or restoring the volume configuration information.

Figure 1:
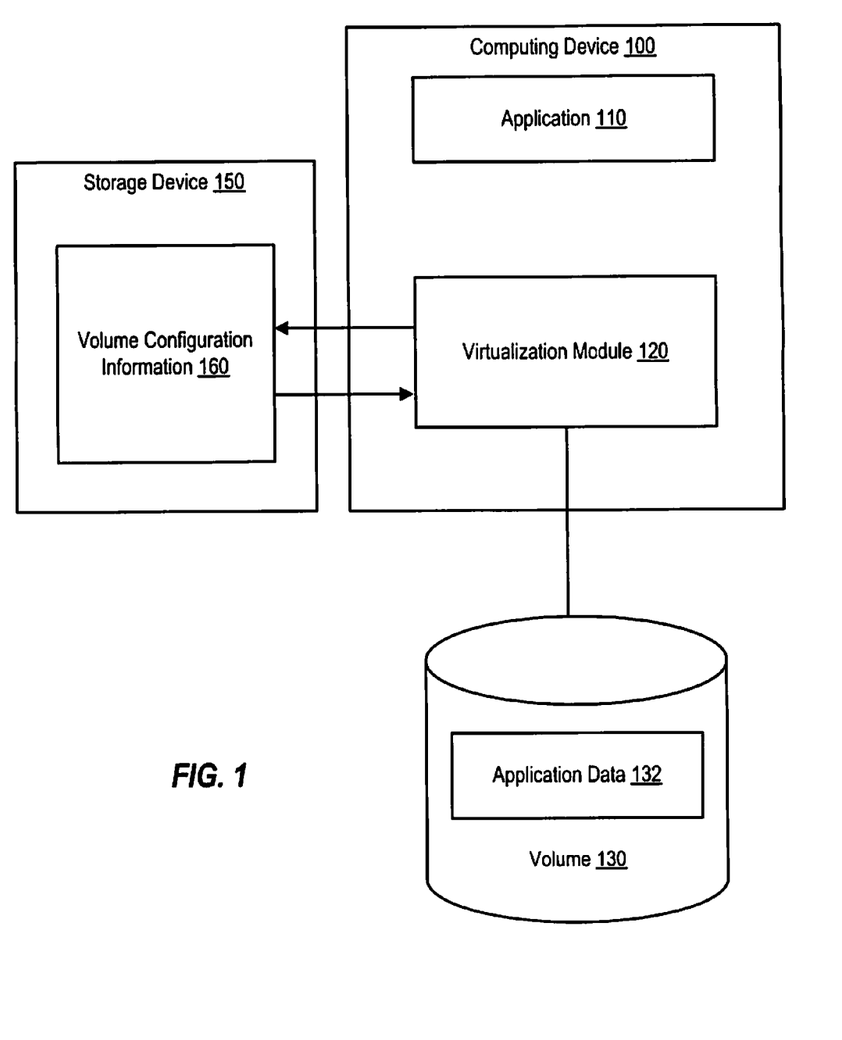
FIG. 1 illustrates a system that includes modules for performing online backup and restore of volume configuration information, according to one embodiment of the present invention.

FIG. 1 illustrates a system that includes modules for performing online backup and restore of volume configuration information. As shown, computing device 100 implements an application 110 (e.g., an operating system, file system, database, word processing application, or the like) and a virtualization module 120. Computing device 100 can be a personal computer, server, network switch, storage device controller, personal digital assistant (PDA), cell phone, or other device. It is noted that in alternative embodiments, virtualization module 120 is implemented on a different computing device than application 110. Virtualization module 120 can be either in-band (e.g., the virtualization module can implemented in the data path of data being written to the volumes) or out-of-band (e.g., the virtualization module can sit outside the data path).

Computing device 100 is coupled to a volume 130, which is a logical storage device created and/or maintained by virtualization module 120. Volume 130 stores application data 132, which is generated and/or consumed by application 110.

Volume 130 is implemented on at least a portion of each of one or more underlying storage devices (not shown). Virtualization module 120 configures and maintains a volume by generating volume configuration information and storing that volume configuration information on the appropriate underlying storage devices. For example, if virtualization module 120 is creating a mirrored volume, virtualization module 120 generates volume configuration information identifying the location and size of each mirror and stores this volume configuration information on the underlying storage devices on which the mirrored volume is being implemented. Volume configuration information can also include information needed to access and/or configure the underlying storage devices, such as identifiers (IDs) of each storage device, disk signatures, partition tables, and the like.

Computing device 100 is also coupled to storage device 150. Storage device 150 stores a backup copy of volume configuration information 160. Volume configuration information 160 is information that virtualization module 120 uses to access and maintain volume 130. Virtualization module 120 is configured to create the backup copy by reading volume configuration information from each underlying storage device on which a volume is and/or can be implemented. Examples of volume configuration information 160 are provided in FIG. 2.

Virtualization module 120 is configured to perform backups of volume configuration information 160 as well as to restore volume configuration information 160 to one or more storage devices. The incorporation of the backup and restoration functionality into virtualization module 120 eliminates the need to reboot when performing backups and restores. For example, during the normal course of operation of computing device 100, a user (e.g., an administrator or application) can detect that a particular storage device, group, or set of groups has been corrupted. Without first rebooting computing device 100, the user can interact with virtualization module 120 in order to request that volume configuration be restored to the corrupted storage device(s). Virtualization module 120 then copies the appropriate volume configuration information to the corrupted storage devices, without first rebooting. In other words, computing device 100 does not need to be rebooted in between the time the corruption is detected and the time the restore is requested, nor does computing device 100 need to be rebooted in between the time the request is made and the time the copying is performed. Additionally, by incorporating the backup and restore functionality into virtualization module 120, virtualization module 120 can automatically initiate volume configuration information backups whenever the volume configuration information changes.

In some embodiments, virtualization module 120 provides a command line interface via which a user can request a volume configuration information backup and/or a volume configuration information restore. The command line interface includes commands for backing up and restoring volume configuration information. Various options can be specified in addition to these commands in order to further control how backups and restores are performed. For example, for the backup command, options can include "-a", which specifies that volume configuration information all storage devices that are currently in use and configured should be backed up and "-p", which specifies that the volume configuration information should be copied to a backup directory other than the default directory. Additional options include the option to specify one or more specific names of storage devices and/or groups of storage devices, indicating that only volume configuration information for the named storage devices and/or groups should be backed up, and the option to specify a specific directory into which the volume configuration information should be copied (e.g., used with the "-p" option).

Options that can be specified for the restore command can include "-i", which specifies that the restore should be performed even if one of the target groups is missing a storage device; "-p", which specifies that the volume configuration information should be copied from a directory other than the default directory; and "-d", which specifies that the volume configuration information should only be copied to specified storage devices within a specified group. Options can also include an option to specify the names of one or more storage devices (e.g., used with the "-d" option), and an option to specify the names of one or more groups to be restored.

Another command that can be provided by the command line interface is a repair command, which can be used to repair a particular storage device within an online group. Like the other commands, this command can include options such as "-p", to specify a non-default backup directory. When a user selects this command, the user also specifies one or more storage devices to be repaired.

Virtualization module 120 can also support a command that allows a user to view backup volume configuration information. For example, such a command causes virtualization module 120 to output formatted configuration information (e.g., identifying group, storage device, volume, plex, subdisk, and/or other object record information) to a printer and/or monitor. Such a command can include options such as "-a", which indicates that all volume configuration information for all online and/or imported groups should be provided to the user. Other options can include "-p", for specifying a non-default backup directory from which to obtain the volume configuration information as well as an option to specify one or more particular storage devices and/or groups.

Yet another command allows a user to instruct virtualization module 120 to write a user-specified disk signature to a specified storage device. This command allows users to manually write a disk signature to a targeted storage device. Such a command can be used in situations in which the original storage device is so corrupted that the match algorithm fails. The user can then use this command to manually write the original disk signature back to the original disk. Options that can be included in this command include "-f", which indicates that the disk signature can be found in a specified File; an option to specify the targeted storage devices, and an option to specify the disk signature value.

Figure 2:
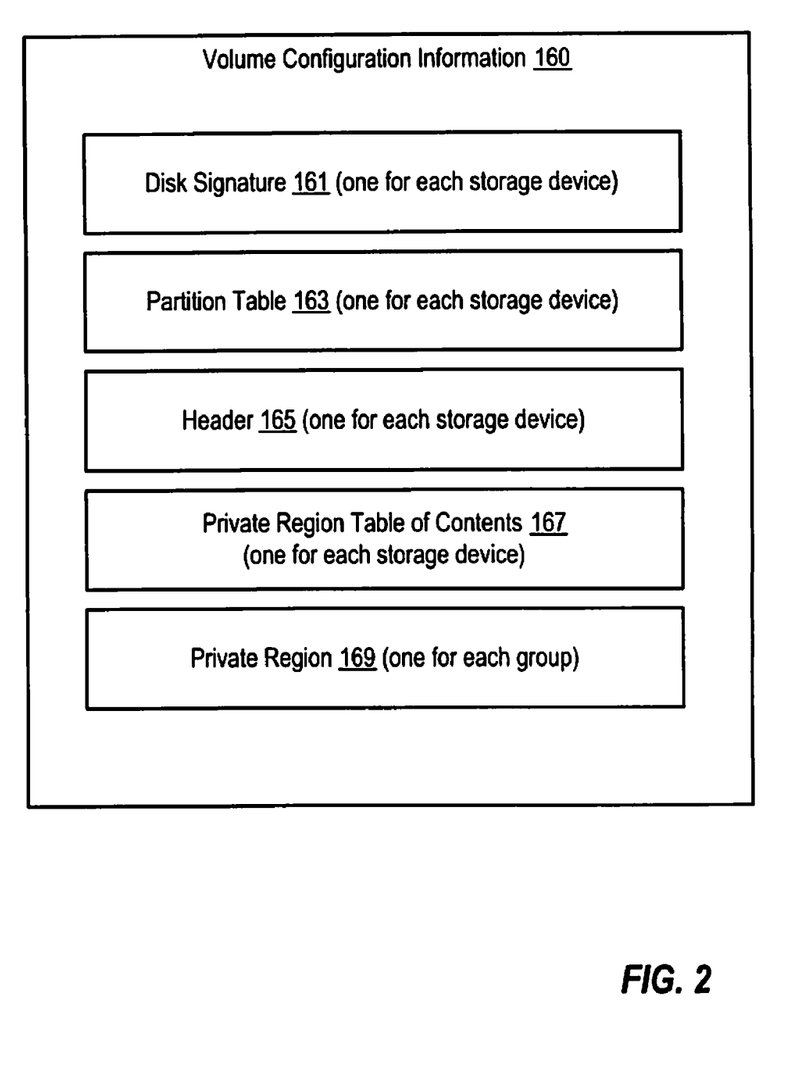
FIG. 2 illustrates various types of volume configuration information, according to one embodiment of the present invention.

FIG. 2 illustrates various types of information that can be included in volume configuration information 160. As shown, the volume configuration information can include signature information 161, partition table information 163, header information 165, private region table of contents 167, and private region information 169. It is noted that type(s) of information included in volume configuration information 160 can vary depending on number and/or type(s) of underlying storage devices used to implement the logical volume as well as depending on the platform (e.g., operating system version) for which the volume is implemented. Additionally, while certain types of data are indicated as being maintained on a per-storage-device basis in FIG. 2 (e.g., FIG. 2 indicates that one disk signature is maintained for each storage device), it is noted that other embodiments can be implemented differently.

A set of volume configuration information 160 can be maintained for each storage device used to implement a volume. Such storage devices can be physical storage devices or logical storage devices. For example, in one embodiment, each physical storage device (or group of physical devices) can be associated with a logical "disk." Volumes are then implemented on one or more disks. Volume configuration information for each volume is maintained on the appropriate logical disks. In alternative embodiments, volumes are implemented directly on physical storage devices, and thus volume configuration information for each volume is maintained on the appropriate physical disks.

Signature information 161 includes a disk signature that uniquely identifies a storage device within a set of storage devices. In one embodiment, this disk signature is a four-byte value that is stored on each storage device, starting at offset 0x1b8h. This disk signature is used by the operating system, such as the operating systems offered by Microsoft Corp. of Redmond, Wash. (e.g., the WINDOWS 2000™ or WINDOWS NT™ operating systems), to map drive letters to storage devices. In some embodiments, the operating system reads the disk signature and stores a copy of the disk signature and a drive letter in a registry item (e.g., the HKEY_LOCAL_MACHINE\SYSTEM\MountedDevices registry item), indicating that the drive letter will be used to identify the disk having that disk signature. The operating system also uses the disk signature as an index into one or more registry items (e.g., the HKEY_LOCAL_MACHINE\SYSTEM\DISK registry item), so that the value of the disk signature determines the information that will be accessed within the registry item. The operating system assigns (e.g., when booting up) drive letters storage devices or volumes by storing the disk signature associated with a particular storage device or volume and the drive letter that is to be assigned to that particular storage device or volume in a registry item. Accordingly, by controlling signature information 161 as part of volume configuration information 160, a virtualization module controls the value that is used to map a drive letter to a storage device and/or to select registry information corresponding to a storage device.

Partition table information 163 contains information describing the partitions currently implemented on the storage device. A partition is a contiguous portion of a single physical disk that functions as though that portion of the physical disk is a physically separate disk.

Header information 165 includes information that is used to identify a particular storage device, such as a disk ID. Private region table of contents 167 includes information identifying the types and location of various information contained within a storage device. Private region information 169 includes the information stored in the private region of a storage device (it is noted that header information 165 and private region table of contents 167 are part of private region information 169 in some embodiments). In one embodiment, the private region information contains 1 MB of data. Private region information includes a configuration database that is used by a virtualization module. The configuration database can store, for example, information indicating the location and/or organization of various mirrors or stripes within a volume.

Some volume configuration information, such as disk signature 161, partition table 163, disk header 165, and private region table of contents 167, is unique to a particular storage device. Other volume configuration information, such as private region 169 is common to all storage devices within the same group.

Figure 3A:
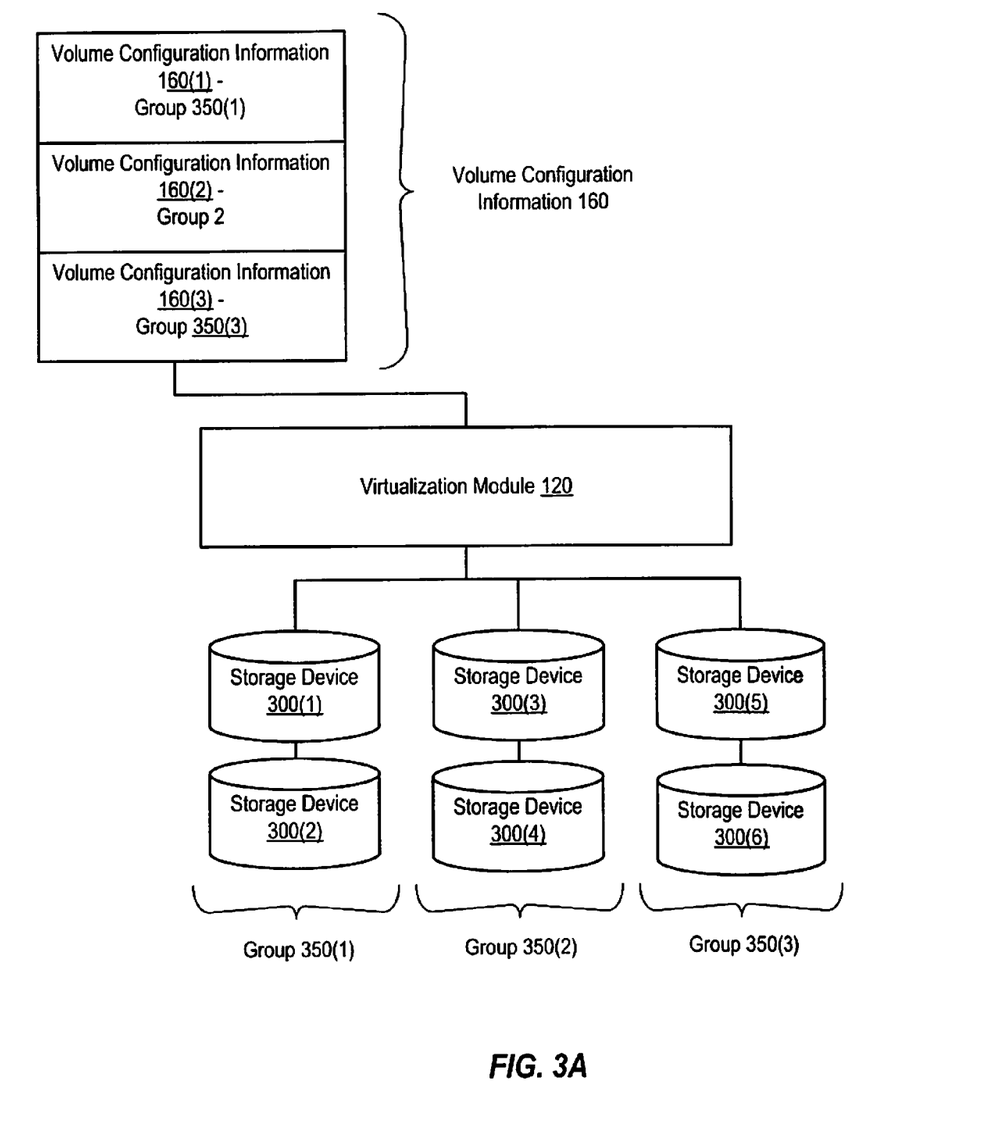
FIG. 3A shows an example of an online backup of volume configuration information, according to one embodiment of the present invention.

FIG. 3A shows an example of an online backup of volume configuration information. As shown in FIG. 3A, virtualization module 120 is coupled to storage devices 300(1)-300(6), which are subdivided into three groups (e.g., disk groups) 350(1)-350(2). Group 350(1) includes storage devices 300(1) and 300(2). Group 350(2) includes storage devices 300(3) and 300(4). Group 350(3) includes storage devices 300(5) and 300(6).

Virtualization module 120 implements one or more volumes (not shown) on each of three groups 350(1)-350(3). For simplicity, each group 350(1)-350(3) is shown as including two storage devices; however, it is noted that the number of storage devices per group can vary among groups (e.g., one group can include a single storage devices, while another group includes 10 storage devices). Furthermore, different embodiments can include different numbers of groups.

Each group 350(1)-350(3) is an associated set of one or more storage devices. A group defines the set of storage devices over which a particular volume can be implemented. A given volume can include portions of any of the storage devices within the same group, but cannot include portions of any storage devices that are not in that group.

In the examples of FIGS. 3A, 3B, 3C, and 3D, each storage device within a given group stores common volume configuration information as each other storage device within the same group. For example, since storage devices 300(3) and 300(4) are both part of group 350(2), storage devices 300(3) and 300(4) have a common configuration, which is part of volume configuration information 160(2). This common configuration facilitates implementation of a volume over more than one of the storage devices in the disk group. Volume configuration information 160(2) also includes information that is specific to particular storage devices within group 350(2). For example, volume configuration information 350(2) can include the disk signature and partition table that is specific to storage device 300(3) as well as the disk signature and partition table that is that is specific to storage device 300(4).

Thus, a different set of volume configuration information is maintained for each disk group. A copy of the volume configuration information for a particular disk group is stored on each disk within that particular disk group. When performing a volume configuration information backup, virtualization module 120 reads the volume configuration information from at least one of the disks in the disk group and writes the volume configuration information to at least one backup storage device. Thus, in the illustrated example, three sets of volume configuration information 160(1)-160(3) have been backed up by copying each of the three sets of volume configuration information to a backup storage device. Volume configuration information 160(1) is the backup copy of volume configuration information for group 350(1). Similarly, volume configuration 160(2) is the backup copy of volume configuration information for group 350(2) and volume configuration information 160(3) is the backup copy of volume configuration information for group 350(3).

Figure 3B:
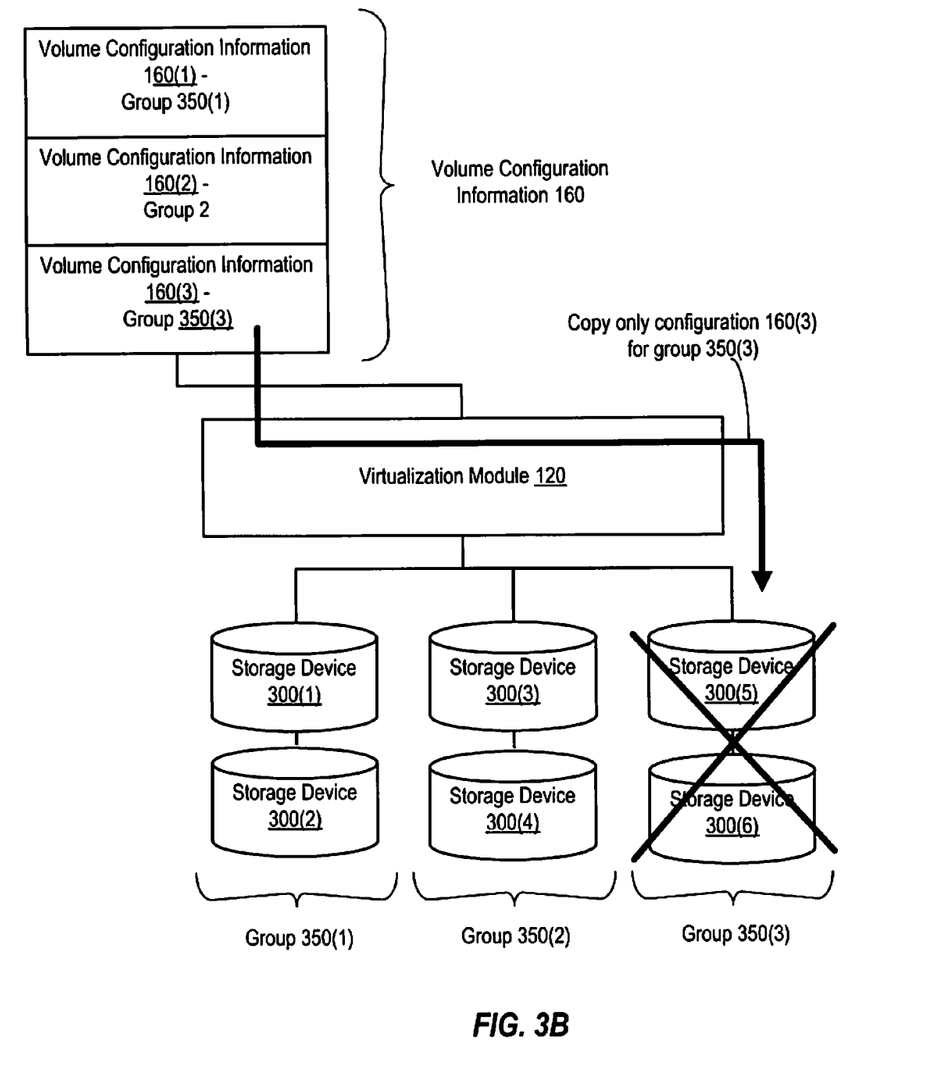
FIG. 3B shows an example of an online restore of volume configuration information, according to one embodiment of the present invention.
Figure 3C:
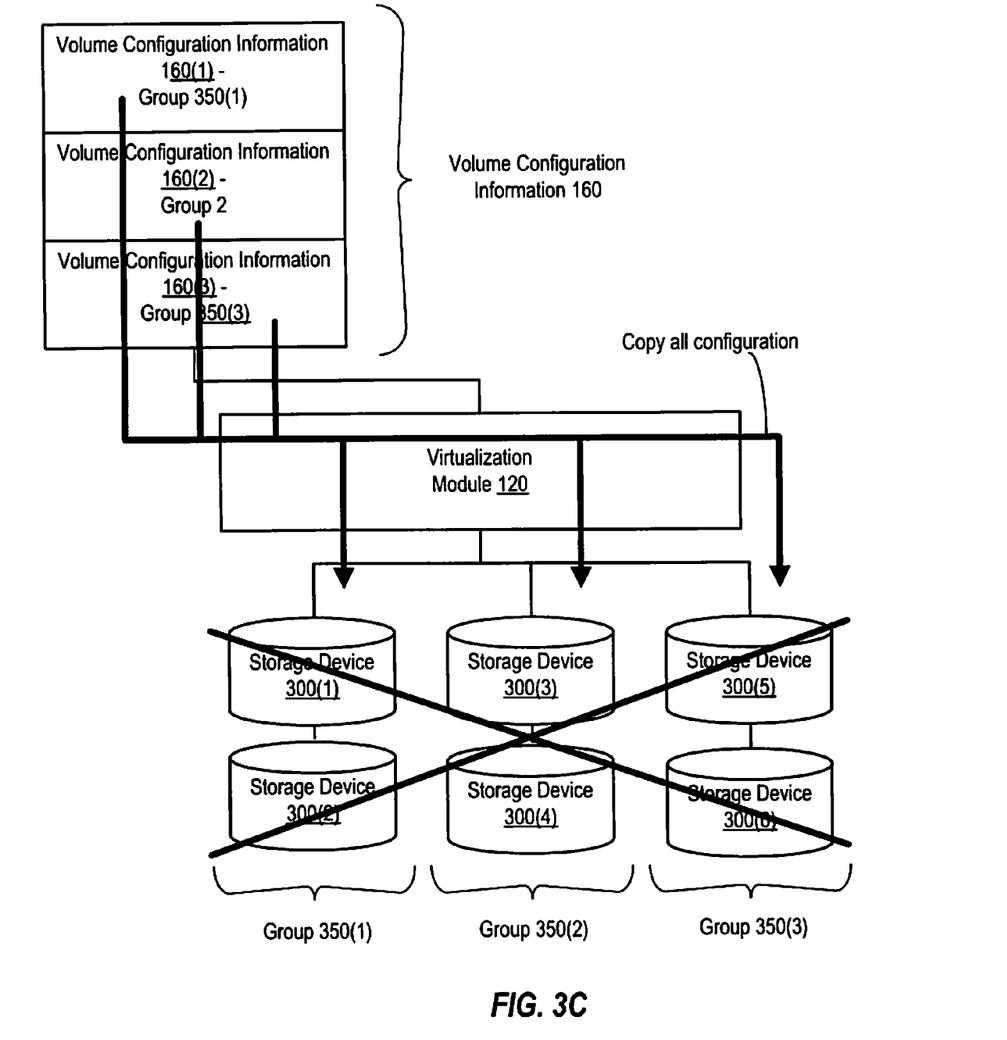
FIG. 3C illustrates another example of an online restore of volume configuration information, according to one embodiment of the present invention.
Figure 3D:
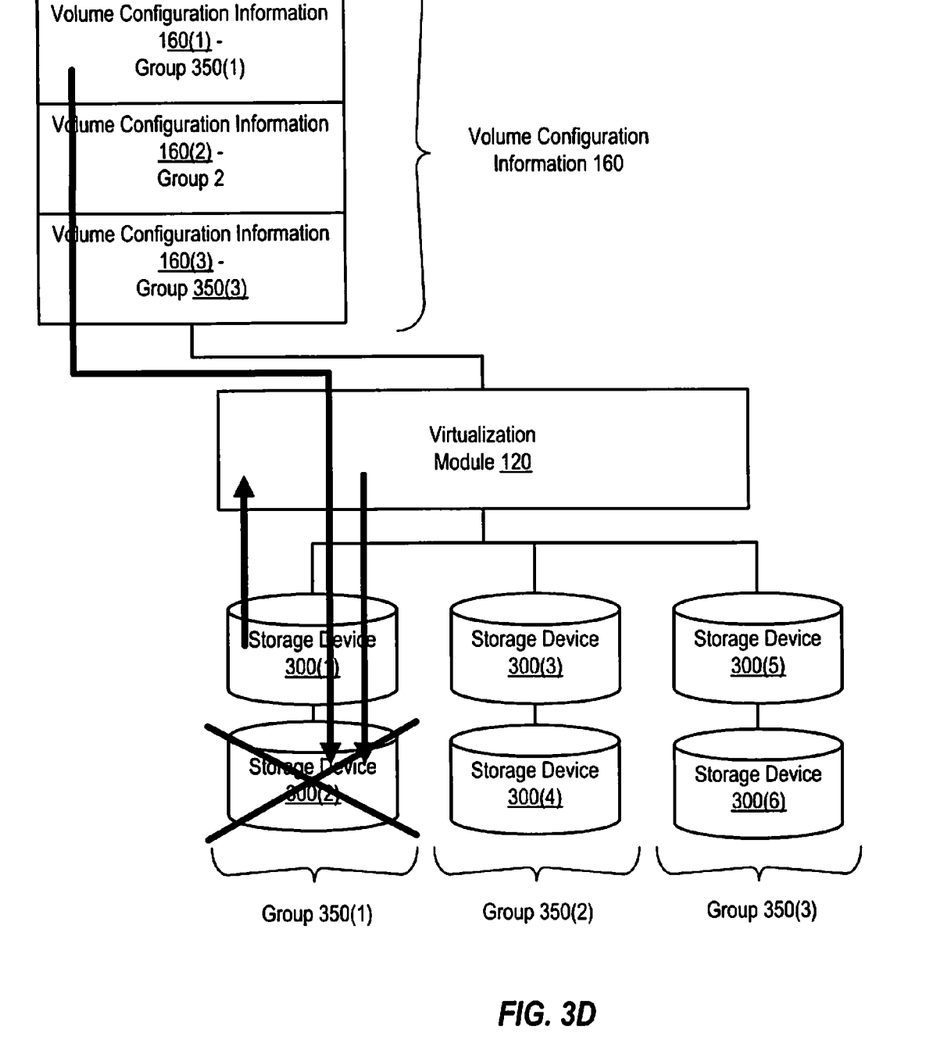
FIG. 3D shows yet another example of an online restore of volume configuration information, according to one embodiment of the present invention.

FIGS. 3B, 3C, and 3D illustrate how the backed up volume configuration information can be used to restore the volume configuration of a particular storage device, group, and/or set of groups. FIG. 3B shows an example of an online restore of volume configuration information to a corrupted group. In this example, the volume configuration information on storage devices 300(5) and 300(6) in group 350(3) has been corrupted, as indicated by the "X" through both storage devices 300(5) and 300(6). In response to a request to restore the volume configuration information 160(3) for group 350(3), virtualization module 120 reads the backed up volume configuration information 160(3) for group 350(3) from the backup storage device and writes this volume configuration information 160(3) to each storage device 300(5) and 300(6), as indicated by the arrow.

In some embodiments, virtualization module 120 confirms that the storage devices 300(5) and 300(6) to which volume configuration information 160(3) is being copied are the same storage devices from which volume configuration 160(3) was originally backed up. For example, virtualization module 120 can implement a matching algorithm that compares all or part of a disk signature and/or other header data (e.g., disk ID, partition information, and the like) in the backup copy of the volume configuration information to information on each storage device 300(5) and 300(6) to be restored. In one embodiment, the matching algorithm first attempts to match the disk IDs included in the backup copy of the volume configuration information to the disk IDs stored on the storage devices to be restored. If the disk IDs match, the restore operation is performed. If any of the disk IDs do not match, the matching algorithm then compares the disk signatures in the back copy with the disk signatures of the storage devices to be restored. If the matching algorithm determines that the information does not match for any of the storage devices, virtualization module 120 will not copy the volume configuration information 160(3) to that storage device. Virtualization module 120 can also return an error indication to a user (e.g., by displaying information on a monitor, sending an email, or the like).

Virtualization module 120 can also provide an option for a user to specify that the volume configuration information should be restored regardless of whether the storage device(s) being restored are the same storage device(s) from which volume configuration information 160(3) was originally backed up. For example, when a user selects to initiate restoration of volume configuration information 160(3), the user can select an option that indicates whether virtualization module 120 should employ the matching algorithm. Alternatively, such an option can be provided when an error indication is provided to the user (due to the matching algorithm detecting a missing or replaced storage device within the group). Such an option allows a disk group having one or more missing and/or replaced storage devices to be restored. Additionally, such an option allows a new set of storage devices to be configured using the backed up volume configuration information.

FIG. 3C illustrates another example of an online restore of volume configuration information. In this example, all of storage devices 300(1)-300(6) have been corrupted, as indicated by the "X." A user requests that volume configuration information 160 be restored for all groups 350(1)-350(3). In response, virtualization module 120 copies volume configuration information 160(1) to each storage device in group 350(1), volume configuration information 160(2) to each storage device in group 350(2), and volume configuration information 160(3) to each storage device in group 350(3), as indicated by the arrows. As noted above, in some embodiments, virtualization module 120 can employ a matching algorithm before restoring each storage device.

FIG. 3D shows how an online restore of volume configuration information is performed for a single corrupted storage device. Here, storage device 300(2) has been corrupted, as indicated by the "X." A user requests that the volume configuration information for storage device 300(2) be restored. In response, virtualization module 120 reads a copy of the common portion of the volume configuration information for group 350(1) from storage device 300(1), which is not corrupted. Virtualization module 120 reads the portion (e.g., the disk signature and partition table) of the volume configuration information that is specific to storage device 300(2) from the backup copy of volume configuration information 160(1). Virtualization module 120 then writes the volume configuration information to storage device 300(2). It is noted that alternatively, virtualization module 120 can also read the common volume configuration information for group 350(1) from backup copy 160(1).

Figure 4:
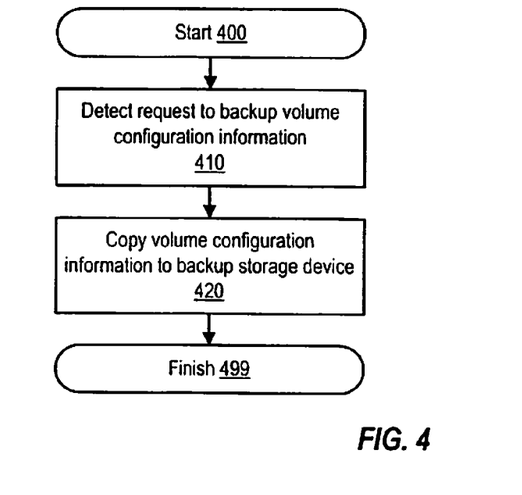
FIG. 4 is a flowchart of a method of performing an online backup of volume configuration information, according to one embodiment of the present invention.

FIG. 4 is a flowchart of a method of performing an online backup of volume configuration information. The method begins at 400. At 410, a request to backup volume configuration information is detected. As noted above, such a request can be received via a command line interface. Alternatively, such a request can be received via an email, instant message, graphical user interface, or the like. Additionally, such a request can be generated automatically (e.g., at prespecified intervals or upon the occurrence of prespecified events). For example, a virtualization module can automatically initiate a backup of volume configuration information in response to detecting that the volume configuration information has been modified. The request to perform the backup can specify that volume configuration information for all online storage devices should be backed up, or that volume configuration information for a selected subset (e.g., a particular storage device or group) of the online storage devices should be backed up. The request can also specify a particular directory into which the backup copy of the volume configuration information should be stored.

In response to the request, the specified volume configuration information is copied to a backup storage device, as shown at 420. The backup copy of the volume configuration information can be copied into a default directory. Alternatively, if another directory is specified in the request, the backup copy can be stored in the specified directory. In one embodiment, the backup copy of the volume configuration is a binary copy of the volume configuration information, as read from a storage device. In other embodiments, a non-binary copy of the volume configuration is used as the backup copy. The method ends at 499.

Figure 5:
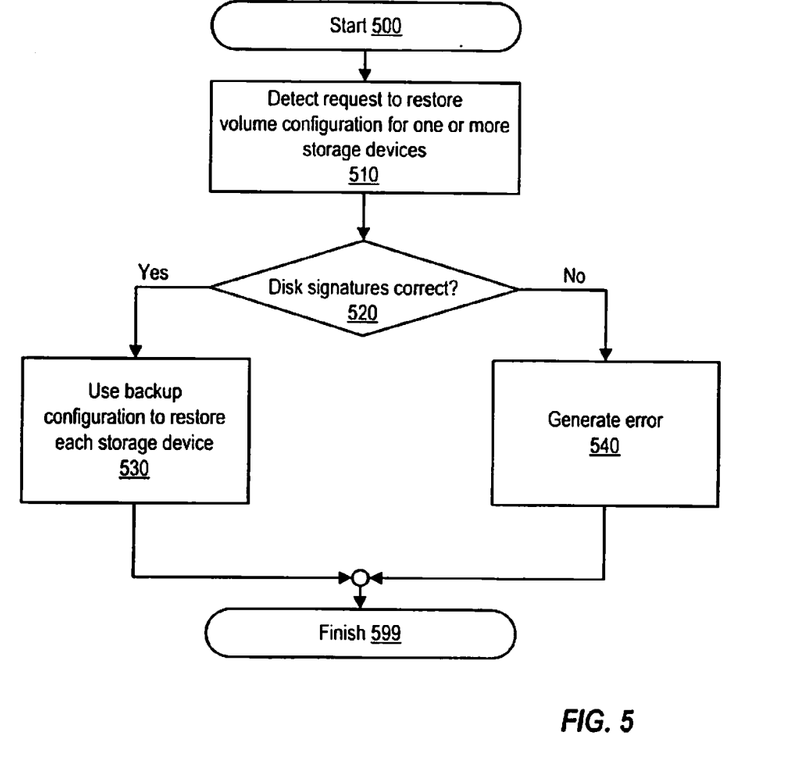
FIG. 5 is a flowchart of a method of performing an online restore of volume configuration information for one or more storage devices in a particular storage device group, according to one embodiment of the present invention.

FIG. 5 is a flowchart of a method of performing an online restore of volume configuration information for one or more storage devices in a particular storage device group. The method begins at 500. At 510, a request to restore volume configuration information for one or more groups is detected. Like a request to backup volume configuration information, a request to restore volume configuration information can be received via a command line interface, a graphical user interface, an email, an instant message, or the like.

At 520, the disk signature of each storage device, to which volume configuration information is being restored, is verified. If the disk signature(s) are correct, the backup copy of the volume configuration is used to restore the storage device(s), as indicated at 530. For example, if the backup copy is a binary copy, the backup copy can be written directly to the appropriate section of the storage device being restored. If the backup copy is a non-binary copy, the volume configuration information in the backup copy can be additionally processed before being written to the storage device. If the disk signature(s) are not correct, an error is generated, as indicated at 540. The method ends at 599.

While the method of FIG. 5 verifies disk signatures before restoring the volume configuration information, is noted that alternative embodiments do not verify disk signatures prior to attempting to restore the volume configuration information (e.g., functions 520 and 530 may be eliminated from such embodiments). Also, it is noted that in embodiments that do verify disk signatures, the decision (at 520) as to whether disk signatures are correct can be made on a storage device-by-storage device basis or a group-by-group basis. For example, in the former situation, if one storage device within a group is missing and/or has an incorrect disk signature, other storage devices within the group can still be restored if the disk signatures of those storage devices are verified. In the latter situation, if any disk signature of any storage device within a particular group is not correct, none of the storage devices within that group will be restored.

Figure 6:
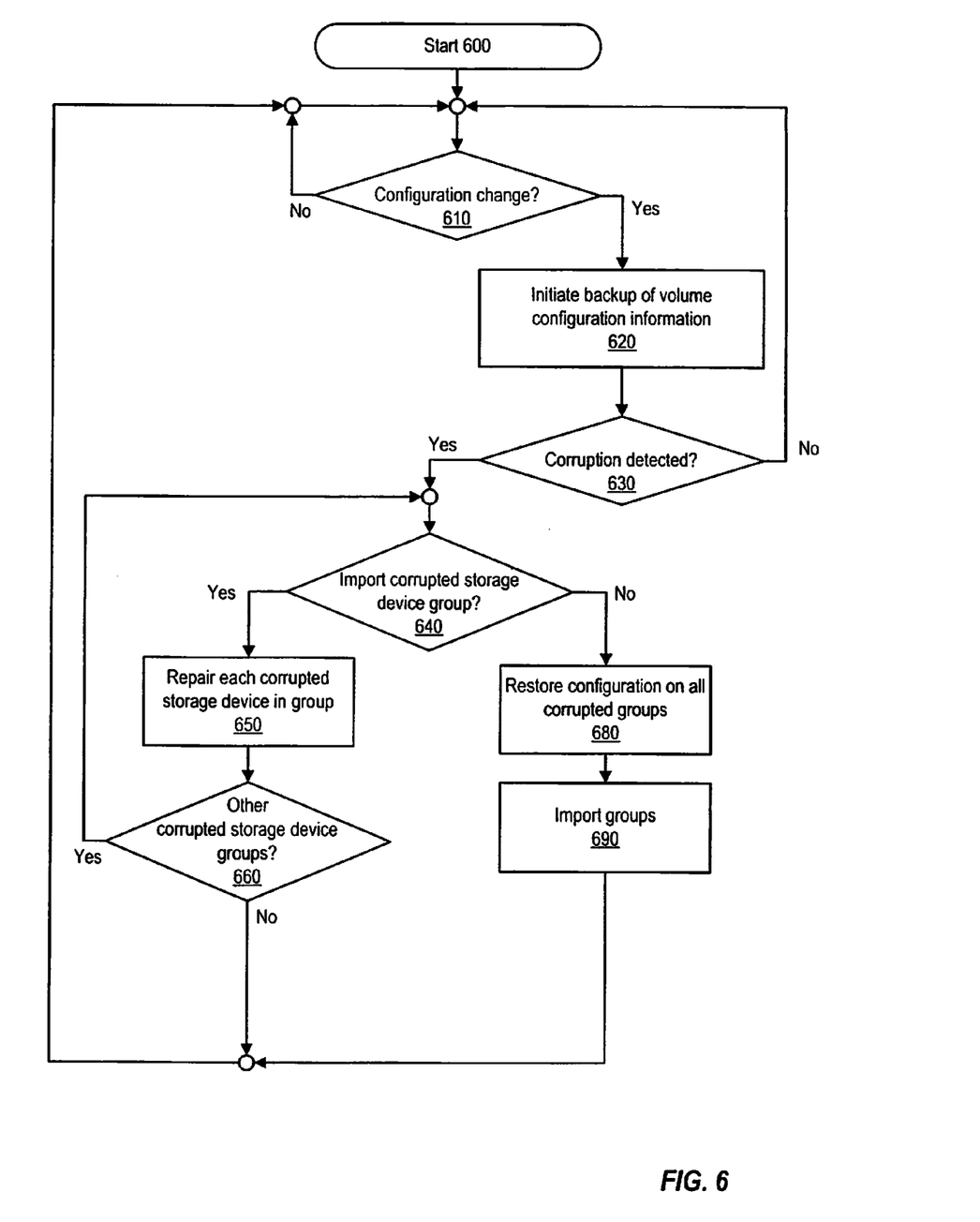
FIG. 6 is a flowchart of a method of performing online backup and restore of volume configuration information, according to one embodiment of the present invention.

FIG. 6 is a flowchart of a method of performing backup and restore of volume configuration information. The method begins at 600.

At 610, if a volume configuration change is detected, a backup of the volume configuration information is initiated. It is noted that volume configuration information backups can also (or alternatively) be initiated in response to a user-generated request (e.g., as discussed above with respect to FIG. 4).

If corruption of a storage device or group of storage devices is detected (e.g., by the virtualization module or by a user, as indicated by the user generating a request for repair and/or restoration of volume configuration information), at 630, an attempt is made to import the corrupted storage device(s) and/or group(s) or storage devices. If it is possible to import a corrupted group, as detected at 640, it indicates that at least some of the storage devices within that group have not been corrupted. Accordingly, the corrupted storage device(s) within the group can be repaired (e.g., by invoking the repair command described above). Repairing a storage device involves using common volume configuration information from the non-corrupted storage devices (e.g., as described above with respect to FIG. 3D) and storage-device-specific volume configuration information from the backup copy. If other corrupted groups of storage devices remain, as detected at 660, function 640 can be repeated for those storage device groups.

If it is not possible to import a corrupted group, the volume configuration information is restored to the group, as shown at 680-690. At 680, the volume configuration information for the group is then restored to each storage device within the group from the backup copy, which was generated at 610. After the volume configuration information has been restored, the group is imported, as indicated at 690. In some embodiments, groups that can be repaired (e.g., by functions 650 and 660) are handled before groups that need to be restored (e.g., by functions 680-690).

Figure 7:
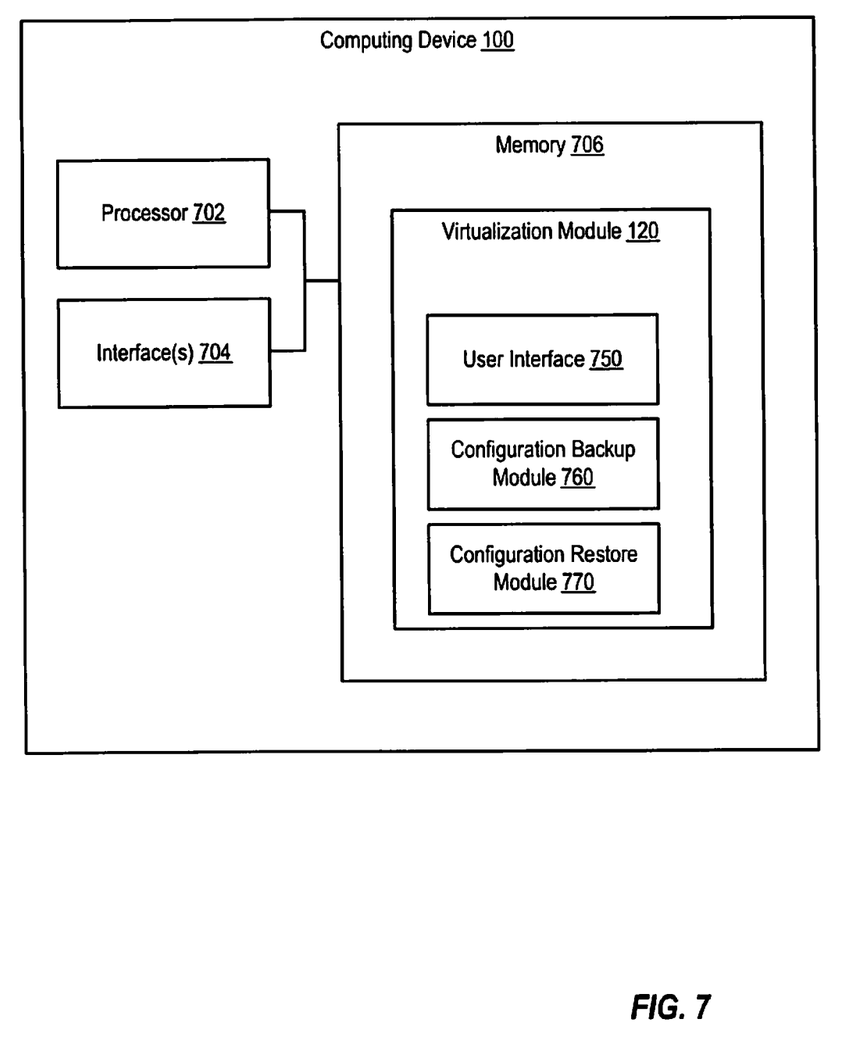
FIG. 7 is a block diagram of a computing device, according to one embodiment of the present invention.

FIG. 7 is a block diagram of a computing device. Computing device 100 includes at least one processor 702, one or more interfaces 704, and a memory 706. Processor 702 can be a microprocessor, PLD (Programmable Logic Device), ASIC (Application Specific Integrated Circuit), or other device configured to execute program instructions stored in memory 706. Memory 706 can include various types of RAM (Random Access Memory), ROM (Read Only Memory), Flash memory, MEMS (Micro Electro-Mechanical Systems) memory, and the like. Processor(s) 702, interface(s) 704, and memory 706 are coupled to send and receive data and control signals by one or more buses or other interconnects.

Interface(s) 704 can include network interfaces to various networks and/or interfaces to various peripheral buses. Interface(s) 704 can include an interface to one or more storage devices (e.g., persistent storage devices that backup copies of volume configuration information as well as storage devices that are used to implement one or more volumes). Interface(s) 704 can also include an interface to a network, for use in communicating with other computing systems and/or for use in communicating with networked storage devices. For example, interface(s) 704 can be used to communicate with clients, and/or to access a storage volume via a SAN.

Memory 706 stores the data and program instructions, executable by processor 702, to implement virtualization module 120. In this example, virtualization module 120 includes user interface 750, configuration backup module 752, and configuration restore module 754. User interface 750 is an interface via which a user can specify commands (e.g., the backup, restore, repair, write disk signature, and view commands discussed above). Configuration backup module 752 is configured to backup volume configuration information from one or more storage devices on which a volume is implemented to a backup storage device (e.g., as described with respect to FIGS. 3A and 4). Configuration restore module 754 is configured to restore and repair volume configuration information on one or more storage devices by using a backup copy of the volume configuration information (e.g., as described with respect to FIGS. 3B, 3C, 3D, 5, and 6).

The program instructions and data implementing virtualization module 120 can be stored on various computer readable media such as memory 706. In some embodiments, such software is stored on a computer readable medium such as a CD (Compact Disc), DVD (Digital Versatile Disc), hard disk, optical disk, tape device, floppy disk, and the like). In order be executed by processor 702, the instructions and data implementing virtualization module 120 are loaded into memory 706 from the other computer readable medium. Such instructions and/or data can also be transferred to computing device 100 for storage in memory 706 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing virtualization module 120 are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:
  receiving a request to restore a volume configuration; and
  writing volume configuration information to a storage device, in response to the request, wherein
    the volume configuration information comprises a first disk signature, and
    the first disk signature identifies the storage device and is used to map a drive letter to the storage device, wherein
      a copy of the first disk signature is stored in a registry item, and
      the registry item is used to associate the drive letter and the first disk signature.

2. The method of claim 1, further comprising:
  comparing a second disk signature stored on the storage device with the first disk signature included in the volume configuration information.

3. The method of claim 2, wherein
  the comparing is performed prior to the writing the volume configuration information to the storage device, and
  the writing the volume configuration information to the storage device is performed in response to the second disk signature equaling the first disk signature.

4. The method of claim 3, further comprising:
  copying the volume configuration information from one or more storage devices.

5. The method of claim 4, wherein
  the copying is initiated in response to detection of a request to backup the volume configuration information, and
  the copying comprises copying the volume configuration information from the one or more storage devices to a backup storage device.

6. The method of claim 4, wherein the copying comprises:
  generating a binary copy of configuration information stored on the one or more storage devices.

7. The method of claim 6, wherein the copying comprises:
  generating a logical copy of configuration information stored on the one or more storage devices.

8. The method of claim 7, wherein
  the one or more storage devices are implemented using a storage technology other than a storage technology used in the storage device being restored.

9. The method of claim 4, wherein the volume configuration information comprises:
  a drive letter corresponding to each of the one or more storage devices.

10. The method of claim 4, wherein
  the one or more storage devices form a logical storage device group,
  the logical storage device group comprises the storage device,
  the copying comprises copying the volume configuration information from a first one of the one or more storage devices, and
  the writing comprises writing the volume configuration information to a second one of the storage devices.

11. The method of claim 3, further comprising:
  copying a plurality of sets of volume configuration information, wherein
    each set of volume configuration information is copied from a respective one of a plurality of logical storage device groups, and
    the writing comprises writing one of the sets of volume configuration information to one or more storage devices within a single one of the logical storage device groups.

12. The method of claim 3, further comprising:
  copying a plurality of sets of volume configuration information, wherein
    each set of volume configuration information is copied from a respective one of a plurality of logical storage device groups, and
    the writing comprises writing each of the sets of volume configuration information to one or more storage devices within the respective one of the logical storage device groups.

13. The method of claim 3, further comprising:
  providing a user interface to a user, wherein
    the request is received via the user interface, and
    the user accesses the user interface without performing a reboot.

14. The method of claim 3, further comprising:
  comparing a first disk identifier stored on the storage device with a second disk
    signature included in the volume configuration information, wherein
    the comparing the second disk signature with the first disk signature is performed in response to the first disk identifier not matching the second disk identifier.

15. The method of claim 1, further comprising:
  copying the volume configuration information from one or more storage devices, in response to detection of a modification to the volume configuration information, wherein
    the copying comprises copying the volume configuration information from the one or more storage devices to a backup storage device.

16. A system comprising:
  means for receiving a request to restore a volume configuration; and
  means for writing volume configuration information to a storage device, in response to the request, wherein
    the volume configuration information comprises a first disk signature, and
    the first disk signature identifies the storage device and is used to map a drive letter to the storage device, wherein
      a copy of the first disk signature is stored in a registry item, and
      the registry item is used to associate the drive letter and the first disk signature.

17. The system of claim 16, further comprising:
  means for comparing a second disk signature stored on the storage device with the first disk signature included in the volume configuration information, prior to the writing the volume configuration information to the storage device, wherein the volume configuration information is written to the storage device in response to the second disk signature equaling the first disk signature.

18. The system of claim 16, further comprising:
means for copying the volume configuration information from one or more storage devices, wherein
the one or more storage devices are implemented using a storage technology other than a storage technology used in the storage device being restored.

19. The system of claim 16, further comprising:
means for copying the volume configuration information from one or more storage devices to a backup storage device, in response to detection of a modification to the volume configuration information.

20. The system of claim 19, further comprising:
providing a user interface to a user, wherein
the request is received via the user interface, and
the user accesses the user interface without performing a reboot.

21. A system comprising:
a processor; and
a memory coupled to the processor, wherein the memory stores program instructions executable by the processor to:
detect a request to restore a volume configuration; and
write volume configuration information to a storage device, in response to the request, wherein
the volume configuration information comprises a first disk signature, and
the first disk signature identifies the storage device and is used to map a drive letter to the storage device, wherein
a copy of the first disk signature is stored in a registry item, and
the registry item is used to associate the drive letter and the first disk signature.

22. The system of claim 21, wherein the program instructions are further executable to:
compare a second disk signature stored on the storage device with the first disk signature included in the volume configuration information, prior to writing the volume configuration information to the storage device, wherein
the volume configuration information is written to the storage device in response to the second disk signature equaling the first disk signature.

23. The system of claim 21, wherein the program instructions are further executable to:
copy the volume configuration information from one or more storage devices, wherein
the one or more storage devices are implemented using a storage technology other than a storage technology used in the storage device being restored.

24. The system of claim 21, wherein the program instructions are further executable to:
copy the volume configuration information from one or more storage devices to a backup storage device, in response to detection of a modification to the volume configuration information.

25. The system of claim 24, wherein the program instructions are further executable to:
provide a user interface to a user, wherein
the request is received via the user interface, and
the user accesses the user interface without performing a reboot.

26. A computer readable storage medium comprising program instructions executable to:
detect a request to restore a volume configuration; and
write volume configuration information to a storage device, in response to the request, wherein
the volume configuration information comprises a first disk signature, and
the first disk signature identifies the storage device and is used to map a drive letter to the storage device, wherein
a copy of the first disk signature is stored in a registry item, and
the registry item is used to associate the drive letter and the first disk signature.

27. The computer readable storage medium of claim 26, wherein the program instructions are further executable to:
compare a second disk signature stored on the storage device with the first disk signature included in the volume configuration information, prior to writing the volume configuration information to the storage device, wherein
the volume configuration information is written to the storage device in response to the second disk signature equaling the first disk signature.

28. The computer readable storage medium of claim 26, wherein the program instructions are further executable to:
copy the volume configuration information from one or more storage devices, wherein
the one or more storage devices are implemented using a storage technology other than a storage technology used in the storage device being restored.

29. The computer readable storage medium of claim 28, wherein the program instructions are further executable to:
copy the volume configuration information from one or more storage devices to a backup storage device, in response to detection of a modification to the volume configuration information.

30. The computer readable storage medium of claim 29, wherein the program instructions are further executable to:
provide a user interface to a user, wherein
the request is received via the user interface, and
the user accesses the user interface without performing a reboot.

31. A method comprising:
receiving a request to restore a volume configuration; and
writing volume configuration information to a storage device, in response to the request, wherein
the volume configuration information comprises a first disk signature, and
the first disk signature identifies the storage device; and
copying the volume configuration information from one or more storage devices, wherein
the one or more storage devices are implemented using a storage technology other than a storage technology used in the storage device being restored.

* * * * *